US010210690B1

(12) United States Patent
Foran et al.

(10) Patent No.: US 10,210,690 B1
(45) Date of Patent: Feb. 19, 2019

(54) HOUSING FOR RADIO-FREQUENCY IDENTIFICATION/NEAR-FIELD COMMUNICATION TAG AND STRAP FOR SAME

(71) Applicant: Google LLC, Mountain View, CA (US)

(72) Inventors: Daniel P. Foran, San Francisco, CA (US); Hae rim Jeong, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/793,368

(22) Filed: Oct. 25, 2017

(51) Int. Cl.
G07C 9/00 (2006.01)
B29C 45/26 (2006.01)
G06K 19/077 (2006.01)
E05B 19/00 (2006.01)
E05B 19/26 (2006.01)

(52) U.S. Cl.
CPC .......... *G07C 9/00944* (2013.01); *B29C 45/26* (2013.01); *E05B 19/0082* (2013.01); *E05B 19/26* (2013.01); *G06K 19/07749* (2013.01); *G07C 2009/00984* (2013.01)

(58) Field of Classification Search
CPC ................................................. G07C 9/00944
USPC ....................................................... 340/5.61
See application file for complete search history.

(56) References Cited

U.S. PATENT DOCUMENTS

2007/0079536 A1  4/2007  Hall
2007/0290932 A1* 12/2007  Morris ..................... H01Q 1/42
                                                              343/702
2008/0309497 A1  12/2008  Bryant
2009/0038735 A1  2/2009  Kian
2009/0057353 A1  3/2009  Thomas
2009/0114687 A1  5/2009  Wu et al.
2009/0200347 A1  8/2009  Edralin
2011/0158762 A1  6/2011  Promise
2011/0162654 A1* 7/2011  Carroll .................. A61M 16/06
                                                              128/206.21
2011/0299256 A1* 12/2011  Leiba ...................... H01L 23/66
                                                              361/752
2013/0022518 A1  1/2013  Park et al.
2013/0059702 A1  3/2013  Page et al.
(Continued)

OTHER PUBLICATIONS

"Compression Molding", Article, 1993, pp. 1-3, Wikipedia, https://en.wikipedia.org/wiki/Compression_molding.

(Continued)

*Primary Examiner* — Santiago Garcia
(74) *Attorney, Agent, or Firm* — Morris & Kamlay LLP

(57) ABSTRACT

A housing can include a first part and a second part. Each of the first part and the second part can include a first surface, a second surface, a third surface, a fourth surface, and a fifth surface. The second surface can form a first edge with the first surface. The third surface can form a second edge with the second surface. The fourth surface can form a third edge with the third surface. The first part can be attached, via an attachment, to the second part so that the first surfaces form an exterior surface of the housing, the second surfaces abut each other, the third surfaces abut each other, the fourth surfaces abut each other, and the fifth surfaces define an interior space of the housing. The attachment can be within the interior space and can include an ultrasonic weld. The housing can house an antenna.

18 Claims, 10 Drawing Sheets

(56) References Cited

U.S. PATENT DOCUMENTS

| | | | |
|---|---|---|---|
| 2013/0105557 A1 | 5/2013 | Spicer et al. | |
| 2014/0084494 A1* | 3/2014 | Bonde | F02M 19/10 261/44.2 |
| 2014/0231475 A1 | 8/2014 | Donnelly | |
| 2014/0273284 A1 | 9/2014 | Annunziata | |
| 2015/0061872 A1* | 3/2015 | Chandramowle | G08B 13/2434 340/572.9 |
| 2015/0243145 A1* | 8/2015 | Nguyen | G08B 13/2434 340/572.8 |
| 2016/0068793 A1 | 3/2016 | Maggiore | |
| 2016/0363957 A1 | 12/2016 | Stroetmann | |
| 2016/0375278 A1* | 12/2016 | Blondeau | A62B 35/0006 182/3 |
| 2017/0195763 A1* | 7/2017 | Cheney | H04R 1/026 |
| 2018/0014626 A1 | 1/2018 | Tang | |
| 2018/0057088 A1* | 3/2018 | Karelse | A47D 1/10 |

OTHER PUBLICATIONS

"Multi-Material Injection Molding", Article, pp. 1-3, Wikipedia, "https://en.wikipedia.org/w/index.php?title=Multi-material_injection_molding&oldid=752751846".

"Ultrasonic Welding", Article, pp. 1-6, Wikipedia, https://en.wikipedia.org/wiki/Ultrasonic_welding.

* cited by examiner

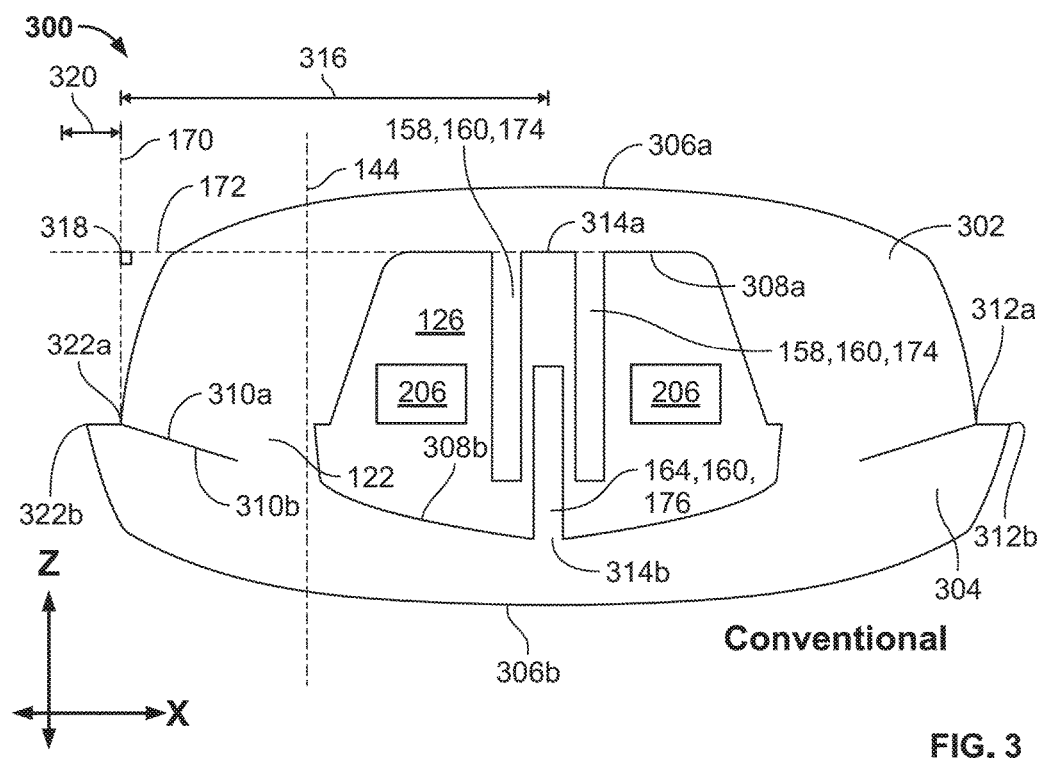
Conventional
FIG. 3

US 10,210,690 B1

HOUSING FOR RADIO-FREQUENCY IDENTIFICATION/NEAR-FIELD COMMUNICATION TAG AND STRAP FOR SAME

BACKGROUND

A conventional key fob is a decorative item attached to a keychain. Because the form of many electronic keys often resembles that of conventional key fobs, such electronic keys have come to be referred to as electronic key fobs. As electronic key fobs have become increasingly common, they are often more simply known as fobs. Fobs are typically used to control access to rooms or the operation of vehicles. Fobs usually operate using infrared line-of-sight technology or radio-frequency identification (RFID) technology. Where RFID technology is used, the fob includes a passive RFID tag. A passive RFID tag includes circuitry and an antenna designed to receive a signal from an RFID interrogator and to transmit a response to the RFID interrogator. A passive RFID tag does not have a power source, but rather uses some of the energy received in the signal from the RFID interrogator to provide power to the circuitry of the passive RFID tag to transmit the response.

BRIEF SUMMARY

According to an implementation of the disclosed subject matter, a first part of a housing can include a first surface, a second surface, a third surface, a fourth surface, and a fifth surface. The second surface can form a first edge with the first surface. The third surface can form a second edge with the second surface. The fourth surface can form a third edge with the third surface. The first part of the housing can be configured to be attached, via an attachment, to a second part of the housing so that the first surface and a corresponding first surface of the second part form an exterior surface of the housing, the second surface abuts a corresponding second surface of the second part, the third surface abuts a corresponding third surface of the second part, the fourth surface abuts a corresponding fourth surface of the second part, and the fifth surface and a corresponding fifth surface of the second part define an interior space of the housing. The attachment can be within the interior space.

According to an implementation of the disclosed subject matter, a strap can include a first object and a second object. The first object can have a hole through the first object. The first object can be made from a first material. The first material can have a Young's modulus of a first value. The second object can surround at least most of the first object and can entirely cover the hole. The second object can be bonded to the first object. The second object can be made from a second material. The second material can have the Young's modulus of a second value. The second value can be less than the first value.

According to an implementation the disclosed subject matter, in a method for making a strap, a first object can be produced having a hole through the first object. The first object can be made from a first material. The first material can have a Young's modulus of a first value. In the method, a second object can be produced that surrounds at least most of the first object and that entirely covers the hole. The second object can be bonded to the first object. The second object can be made from a second material. The second material can have the Young's modulus of a second value. The second value can be less than the first value. The strap can include the first object and the second object.

Additional features, advantages, and embodiments of the disclosed subject matter are set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 3 is a diagram illustrating an assembled side view of an example of a conventional housing.

DETAILED DESCRIPTION

Figure 1:
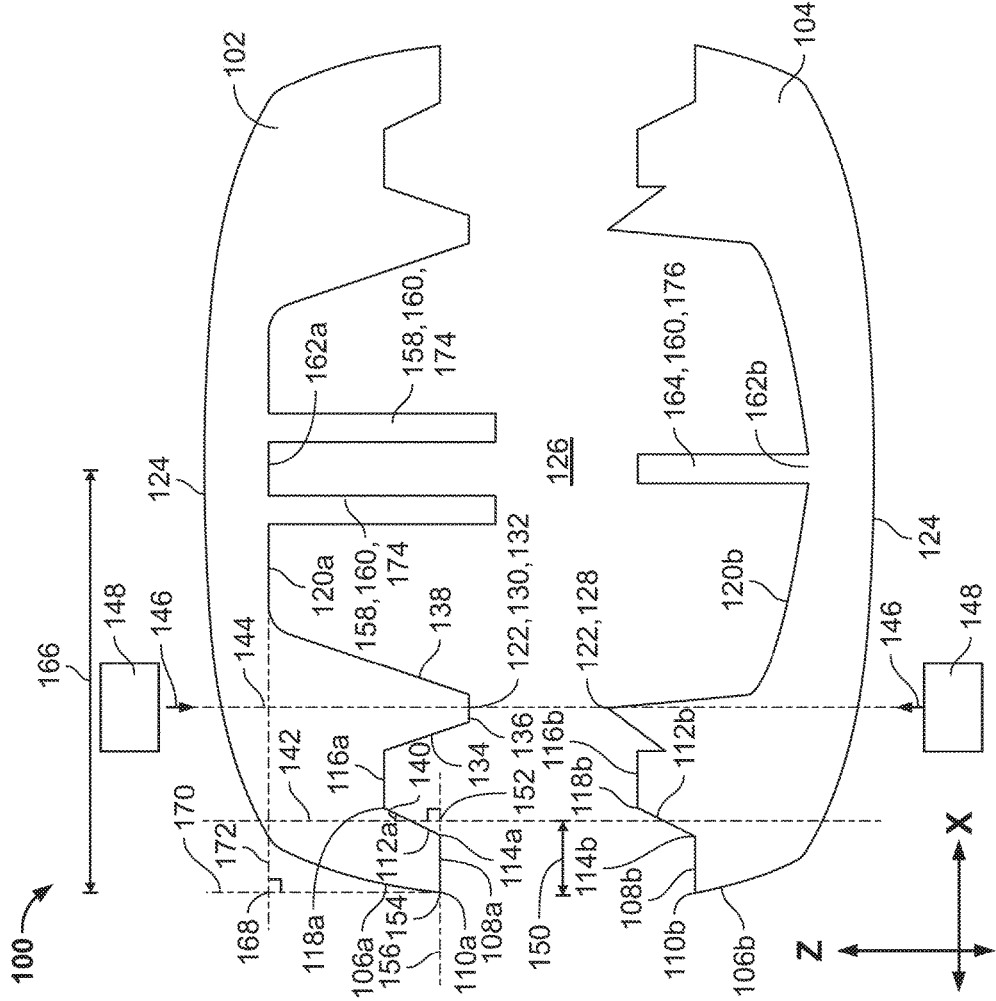
FIG. 1 is a diagram illustrating an exploded side view of an example of a housing according to the disclosed subject matter.

A conventional key fob is a decorative item attached to a keychain. Because the form of many electronic keys often resembles that of conventional key fobs, such electronic keys have come to be referred to as electronic key fobs. As electronic key fobs have become increasingly common, they are often more simply known as fobs. Fobs are typically used to control access to rooms or the operation of vehicles. Fobs usually operate using infrared line-of-sight technology or radio-frequency identification (RFID) technology. Where RFID technology is used, the fob includes a passive RFID tag. A passive RFID tag includes circuitry and an antenna designed to receive a signal from an RFID interrogator and to transmit a response to the RFID interrogator. A passive RFID tag does not have a power source, but rather uses some of the energy received in the signal from the RFID interrogator to provide power to the circuitry of the passive RFID tag to transmit the response. Fobs can also operate using near-field communication (NFC) technology.

Disc-shaped fobs have become popular. A housing of a disc-shaped fob can be made from a first part of the housing attached, via an attachment, to a second part of the housing. The attachment can be a weld. For example, the weld can be an ultrasonic weld. With an ultrasonic weld, a measure of a misalignment between an outer edge of the first part and an outer edge of the second part can be a function of a distance between an alignment mechanism of a part (i.e., the first part or the second part) and an outer edge of this same part.

Generally, a length of a range at which a response from an RFID/NFC tag can be received by another device (e.g., an RFID interrogator or another NFC device), known as a read range, can be a function of a size of the RFID/NFC tag (and, therefore, a size of a fob that includes the RFID/NFC tag). Accordingly, a system that requires a relatively long read range may require a fob having a size larger than a size of a conventional fob. The measure of the misalignment between the outer edge of the first part of such a large-sized fob and the outer edge of the second part of such a large-sized fob can be greater than the measure of the misalignment between the outer edge of the first part of a conventionally-sized fob and the outer edge of the second part of the conventionally-sized fob. Such a greater measure of the misalignment may detract from an aesthetic quality of the large-sized fob.

Additionally, for a variety of reasons it may be desirable to provide a strap to facilitate carrying the large-sized fob.

Aspects disclosed herein describe a housing. A first part of the housing can include a first surface, a second surface, a third surface, a fourth surface, and a fifth surface. The second surface can form a first edge with the first surface. The third surface can form a second edge with the second surface. The fourth surface can form a third edge with the third surface. The first part of the housing can be configured to be attached, via an attachment, to a second part of the housing so that the first surface and a corresponding first surface of the second part form an exterior surface of the housing, the second surface abuts a corresponding second surface of the second part, the third surface abuts a corresponding third surface of the second part, the fourth surface abuts a corresponding fourth surface of the second part, and the fifth surface and a corresponding fifth surface of the second part define an interior space of the housing. The attachment can be within the interior space.

Aspects disclosed herein describe a strap. The strap can include a first object and a second object. The first object can have a hole through the first object. The first object can be made from a first material. The first material can have a Young's modulus of a first value. The second object can surround at least most of the first object and can entirely cover the hole. The second object can be bonded to the first object. The second object can be made from a second material. The second material can have the Young's modulus of a second value. The second value can be less than the first value.

Aspects disclosed herein describe in a method for making a strap. In the method, a first object can be produced having a hole through the first object. The first object can be made from a first material. The first material can have a Young's modulus of a first value. In the method, a second object can be produced that surrounds at least most of the first object and that entirely covers the hole. The second object can be bonded to the first object. The second object can be made from a second material. The second material can have the Young's modulus of a second value. The second value can be less than the first value. The strap can include the first object and the second object.

Figure 2:
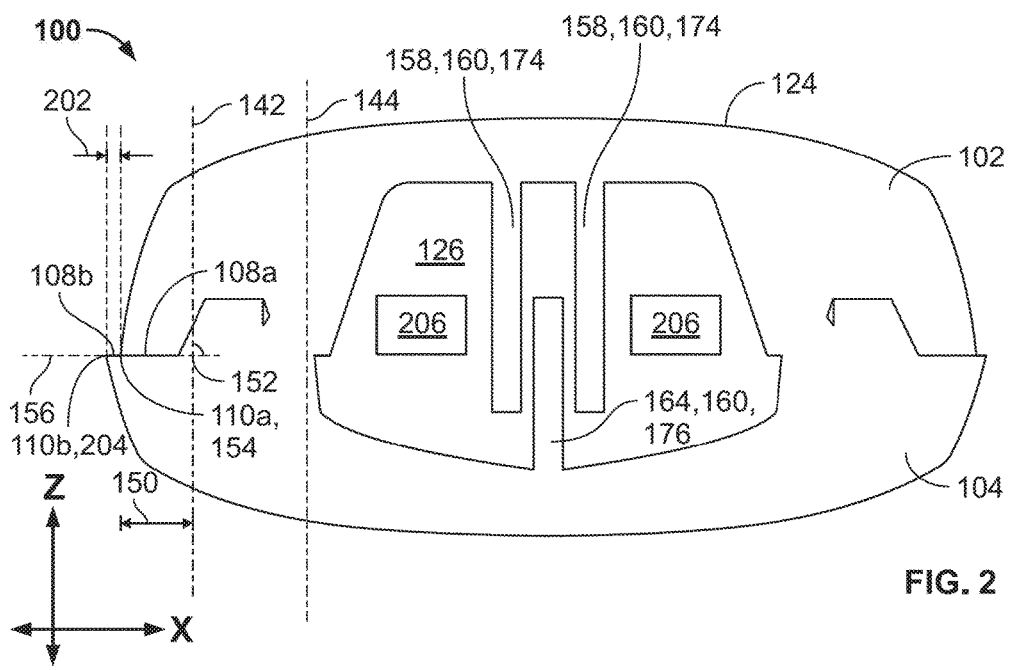
FIG. 2 is a diagram illustrating an assembled side view of the example of the housing according to the disclosed subject matter.

FIG. 1 is a diagram illustrating an exploded side view of an example of a housing 100 according to the disclosed subject matter. FIG. 2 is a diagram illustrating an assembled side view of the example of the housing 100 according to the disclosed subject matter. The housing 100 can include a first part 102 and a second part 104.

The first part 102 of the housing 100 can include a first surface 106a, a second surface 108a, a third surface 112a, a fourth surface 116a, and a fifth surface 120a. The second surface 108a can form a first edge 110a with the first surface 106a. The third surface 112a can form a second edge 114a with the second surface 108a. The fourth surface 116a can form a third edge 118a with the third surface 112a.

The second part 104 of the housing 100 can include a corresponding first surface 106b, a corresponding second surface 108b, a corresponding third surface 112b, a corresponding fourth surface 116b, and a corresponding fifth surface 120b. The corresponding second surface 108b can form a corresponding first edge 110b with the corresponding first surface 106b. The corresponding third surface 112b can form a corresponding second edge 114b with the corresponding second surface 108b. The corresponding fourth surface 116b can form a corresponding third edge 118b with the corresponding third surface 112b.

The first part 102 of the housing 100 can be configured to be attached, via an attachment 122, to the second part 104 of the housing 100 so that the first surface 106a and the corresponding first surface 106b form an exterior surface 124 of the housing 100, the second surface 108a abuts the corresponding second surface 108b, the third surface 112a abuts the corresponding third surface 112b, the fourth surface 116a abuts the corresponding fourth surfaces 116b, and the fifth surface 120a and the corresponding fifth surface 120b define an interior space 126 of the housing 100. The attachment 122 can be within the interior space 126. For example, the attachment 122 can be entirely within the interior space 126.

In an aspect, the attachment 122 can be a weld. For example, the weld can be an ultrasonic weld. In an aspect, the corresponding fifth surface 120b can have an energy director portion 128, and the fifth surface 120a can have a joining surface portion 130. (Alternatively, the corresponding fifth surface 120b can have the joining surface portion 130, and the fifth surface 120a can have the energy director portion 128.) The energy director portion 128 can be near the corresponding fourth surface 116b. The energy director portion 128 can be, for example, a raised triangular bead molded on the corresponding fifth surface 120b. The joining surface portion 130 can be near the fourth surface 116a. For example, the joining surface portion 130 can include a protrusion 132 from the fifth surface 120a. For example, the protrusion 132 can have a first surface of the protrusion 134, a second surface of the protrusion 136, and a third surface of the protrusion 138.

In an aspect, an angle 140 between the third surface 112a and a first line 142 can be less than or equal to 45 degrees. For example, the angle 140 can be less than or equal to 30 degrees. The first line 142 can intersect the third surface 112a and can be parallel to a second line 144. The second line 144 can coincide with a path of a force 146 produced by a tool 148 that produces the attachment 122. For example, the tool 148 can be a sonotrode. The sonotrode can be configured to produce ultrasonic acoustic vibrations at a location of the energy director portion 128 and a location of the joining surface portion 130. Absorption of vibrational energy at the location of the energy director portion 128 and the location of the joining surface portion 130 can cause the energy director portion 128 and the joining surface portion 130 to melt together to form the attachment 122.

With an ultrasonic weld, a measure of misalignment between an outer edge (i.e., the first edge 110a) of the first part 102 and an outer edge (i.e., the first edge 110b) of the second part 104 can be a function of a distance between an alignment mechanism of a part (i.e., the first part 102 or the second part 104) and an outer edge (i.e., the first edge 110a or the first edge 110b) of this same part (i.e., the first part 102 or the second part 104). In an aspect, the second surface 108a, the third surface 112a, and the fourth surface 116a can act as the alignment mechanism of the first part 102, and the corresponding second surface 108b, the corresponding third surface 112b, and the corresponding fourth surface 116b can act as the alignment mechanism of the second part 104.

A first distance 150 between a first point 152 and a second point 154 can be, for example, about one millimeter. The first point 152 can be at an intersection of the first line 142 and a third line 156. The third line 156 can intersect the first edge 110a and can be perpendicular to the first line 142. The second point 154 can intersect the third line 156 and be on the first edge 110a.

A second distance 202 between the second point 154 and a corresponding second point 204 can be a percentage of the first distance 150. The corresponding second point 204 can be on the corresponding first edge 110b of the second part 104 formed between the corresponding first surface 106b and the corresponding second surface 108b. For example, the percentage can be one-half of one percent. If the first distance 150 is one millimeter and the percentage is one-half of one percent, then the second distance 202 can be five micrometers. The second distance 202 can be the measure of the misalignment between the outer edge (i.e., the first edge 110a) of the first part 102 and the outer edge (i.e., the corresponding first edge 110b) of the second part 104.

Optionally, the first part 102 of the housing 100 can further include a first part 158 of an alignment key 160. The first part 158 of the alignment key 160 can be disposed substantially at a center 162a of the fifth surface 120a. Optionally, second part 104 of the housing 100 can further include a second part 164 of the alignment key 160. The second part 164 of the alignment key 160 can be disposed substantially at a center 162b of the corresponding fifth surface 120b.

A third distance 166 between the center 162a and a third point 168 can be about fifteen millimeters. The third point 168 can be at an intersection of a fourth line 170 and a fifth line 172. The fourth line 170 can intersect the first edge 110a and can be parallel to the second line 144. The second line 144 can coincide with the path of the force 146 produced by the tool 148 that produces the attachment 122. The fifth line 172 can intersect the center 162a and can be perpendicular to the fourth line 170.

FIG. 3 is a diagram illustrating an assembled side view of an example of a conventional housing 300. The conventional housing 300 can include a first part 302 and a second part 304.

The first part 302 can include a first exterior surface 306a, a first interior surface 308a, and a first lip 310a. The first exterior surface 306a and the first lip 310a can form a first edge 312a. The first part 302 can further include the first part 158 of the alignment key 160 disposed at a center 314a of the first interior surface 308a.

The second part 304 can include a second exterior surface 306b, a second interior surface 308b, and a second lip 310b. The second exterior surface 306b and the second lip 310b can form a second edge 312b. The second part 304 can further include the second part 164 of the alignment key 160 disposed at a center 314b of the second interior surface 308b.

A fourth distance 316 between the center 314a and a fourth point 318 can be, for example, about fifteen millimeters. The fourth point 318 can be at an intersection of the fourth line 170 and the fifth line 172. The fourth line 170 can intersect the first edge 312a and can be parallel to the second line 144. The second line 144 can coincide with the path of the force 146 produced by the tool 148 that produces the attachment 122. The fifth line 172 can intersect the center 314a and can be perpendicular to the fourth line 170.

A fifth distance 320 between a fifth point 322a and a corresponding fifth point 322b can be a percentage of the fourth distance 316. The fifth point 322a can be on the first edge 312a of the first part 302, the corresponding point 322b can be on the second edge 312b of the second part 304. For example, the percentage can be one-half of one percent. If the fourth distance 316 is fifteen millimeters and the percentage is one-half of one percent, then the fifth distance 320 can be seventy-five micrometers. The fifth distance 320 can be the measure of the misalignment between the outer edge (i.e., the first edge 312a) of the first part 302 and the outer edge (i.e., the corresponding first edge 312b) of the second part 304.

The misalignment of the conventional housing 300 (e.g., seventy-five micrometers) may detract from the aesthetic quality of the conventional housing 300. For example, such a misalignment may be perceptible to an individual who handles the conventional housing 300 as a ridge between the first part 302 and the second part 304. Additionally, the conventional housing 300 may be more likely to appear to be composed from the first part 302 and the separate second part 304 rather than to appear as an indivisible whole.

In comparison, the misalignment of the housing 100 (e.g., five micrometers) may be less likely to be perceptible to an individual who handles the housing 100, and the housing 100 may be more likely to appear as an indivisible whole rather than composed from the first part 102 and the separate second part 104.

With reference to FIGS. 1 and 2, in an aspect, the first part 158 of the alignment key 160 can be a female part 174, and the second part 164 of the alignment key 160 can be a male part 176. (Alternatively, the first part 158 of the alignment key 160 can be the male part 176, and the second part 164 of the alignment key 160 can be the female part 174.)

Figure 4:
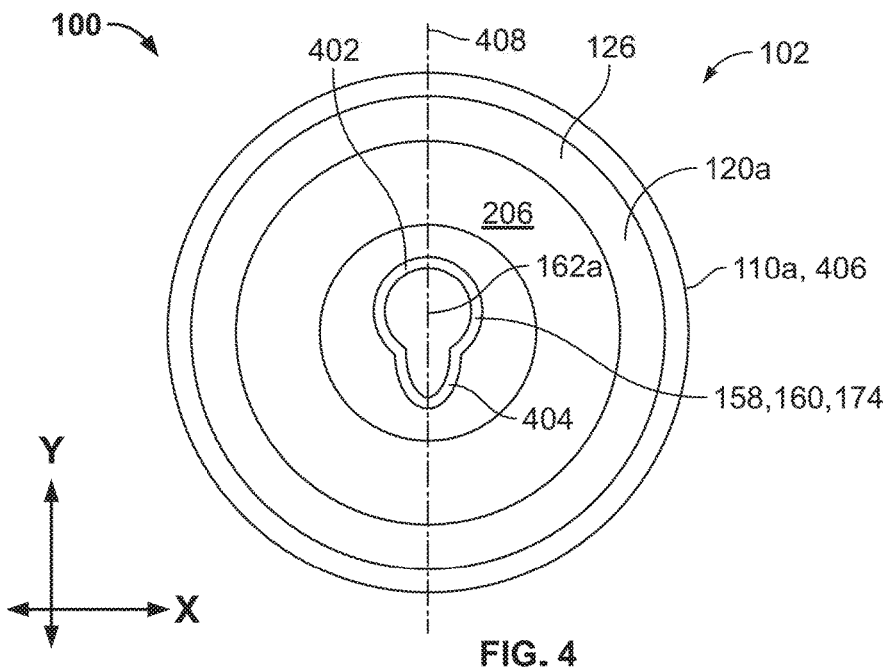
FIG. 4 is a diagram illustrating a top view of an example of the first part of the housing according to the disclosed subject matter.
Figure 5:
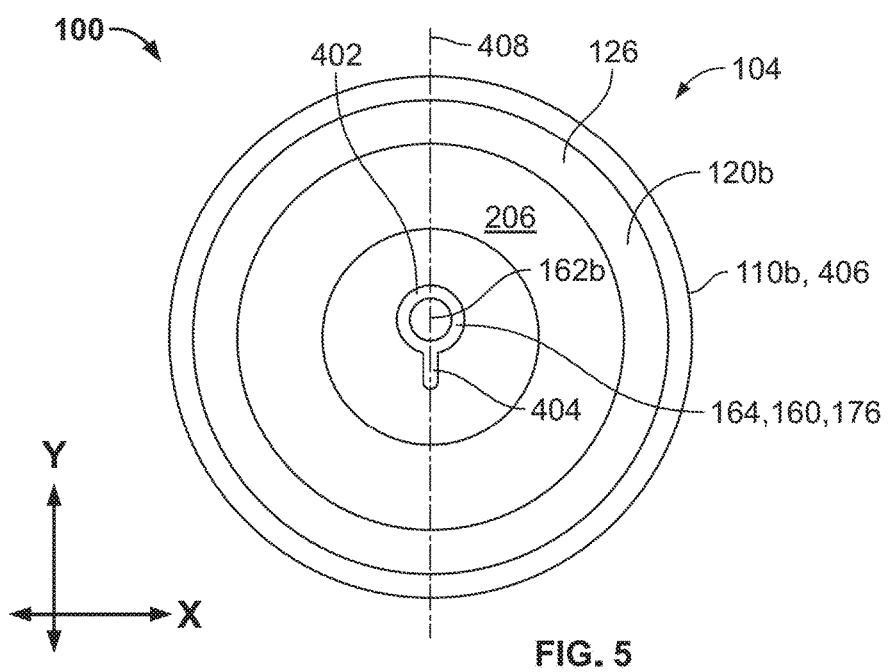
FIG. 5 is a diagram illustrating a top view of an example of the second part of the housing according to the disclosed subject matter.

FIG. 4 is a diagram illustrating a top view of an example of the first part 102 of the housing 100 according to the disclosed subject matter. FIG. 5 is a diagram illustrating a top view of an example of the second part 104 of the housing 100 according to the disclosed subject matter. In an aspect, the first part 158 of the alignment key 160 can have a substantially circular surface 402 with a protrusion 404 from the substantially circular surface 402. (Likewise, in an aspect, the second part 164 of the alignment key 160 can have the substantially circular surface 402 with the protrusion 404 from the substantially circular surface 402.) For example, the first part 158 of the alignment key 160 with the substantially circular surface 402 with the protrusion 404 can be the female part 174, and the second part 164 of the alignment key 160 with the substantially circular surface 402 with the protrusion 404 can be the male part 176.

In an aspect, the first edge 110a, the corresponding first edge 110b, or both can have a substantially circular shape 406.

In an aspect, the housing 100 can have a substantially symmetrical shape, for example, with respect to a sixth line 408.

In an aspect, the first part 102, the second part 104, or both can be made of a material that includes, for example, one or more of polycarbonate, a blend of polycarbonate and acrylonitrile butadiene styrene, acrylonitrile butadiene styrene, acetal, acrylic, acrylic multipolymer, liquid crystal polymers, nylon, phenylene oxide, polycarbonate/polyester, polyester polybutylene terephthalate, polyester terephthalate, polyetherether ketone, polyetherimide, polyethylene, polyphenylene ether, polyphenylene sulfide, polypropylene, polystyrene, polysulfone, polyvinylchloride, styrene acrylonitrile/styrene acrylic copolymer, or styrene block copolymers.

With reference to FIGS. 2, 4, and 5, in an aspect, the housing 100 can be configured to house an antenna 206 in the interior space 126. For example, the housing 100 can be a housing of a fob that includes an RFID tag with the antenna 206 or an NFC tag with the antenna 206.

Figure 6:
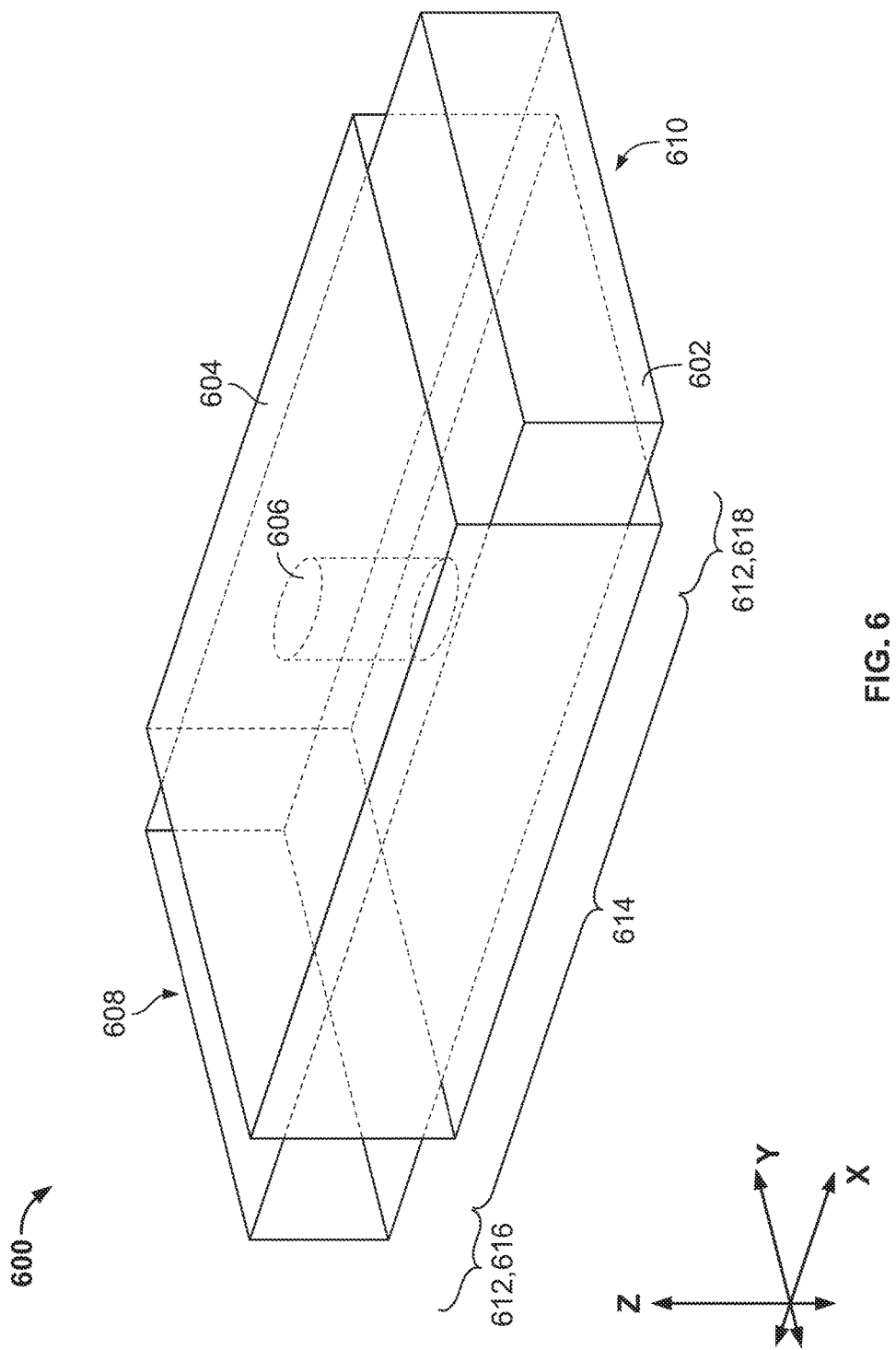
FIG. 6 is a diagram illustrating a perspective view of an example of a strap according to the disclosed subject matter.

FIG. 6 is a diagram illustrating a perspective view of an example of a strap 600 according to the disclosed subject matter. The strap 600 can include a first object 602 and a second object 604. The first object 602 can have a hole 606 through the first object 602. The first object 602 can be made from a first material. The first material can have a Young's modulus of a first value. The second object 604 can surround at least most of the first object 602 and can entirely cover the hole 606. The second object 604 can be bonded to the first object 602. The second object 604 can be made from a second material. The second material can have the Young's modulus of a second value. The second value can be less than the first value. For example, an individual who handles the strap 600 may perceive a pliability of the strap 600 to be greater than the pliability actually is. Optionally, a measure of a hardness of the second material can be a low value on a durometer scale. For example, the individual who handles the strap 600 may perceive the strap 600 to be soft, which may enhance an aesthetic quality of the strap 600.

In an aspect, the first material can include, for example, one or more of polycarbonate, acrylonitrile butadiene styrene, acrylic, nylon, or acetal.

In an aspect, the second material can include, for example, one or more of thermoplastic polyurethane rubber, silicone rubber, ethylene propylene diene monomer, or Santoprene™ thermoplastic vulcanizates.

The strap 600 can have a first end 608 and a second end 610. The strap 600 can have an attaching portion 612 and a carrying portion 614. Optionally, the attaching portion 612 can include a first attaching portion 616 and a second attaching portion 618. The first attaching portion 616 can be disposed at the first end 608. The second attaching portion 618 can be disposed at the second end 610. Optionally, the carrying portion 614 can have a rectangular cuboid shape. Optionally, the second object 604 can entirely surround the first object 602 in the carrying portion 614.

Figure 7:
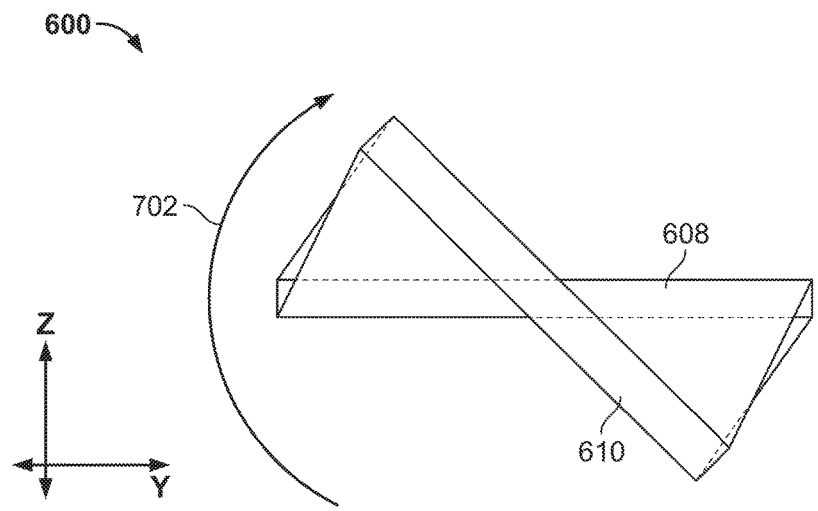
FIG. 7 is a diagram illustrating a side view of an example of the strap according to the disclosed subject matter.

FIG. 7 is a diagram illustrating a side view of an example of the strap 600 according to the disclosed subject matter. A twisting resistance of the strap 600 in a rotational direction 702 can be less than the twisting resistance of another strap (not illustrated) in the rotational direction 702. The other strap can be identical to the strap 600 except that the other strap can lack the hole 606.

Figure 8:
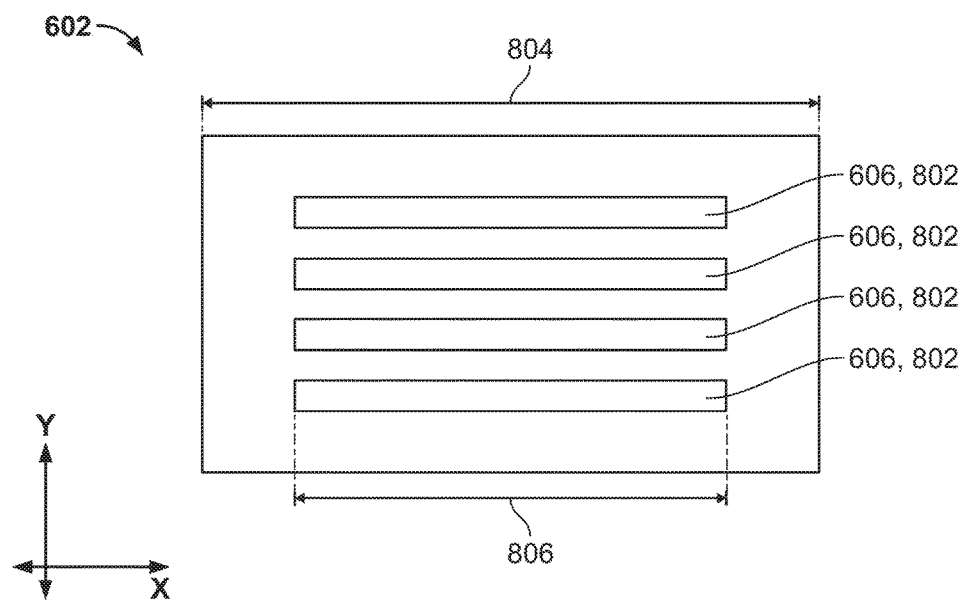
FIG. 8 is a diagram illustrating a top view of an example of the first object of the strap according to the disclosed subject matter.

FIG. 8 is a diagram illustrating a top view of an example of the first object 602 of the strap 600 according to the disclosed subject matter. Optionally, the hole 606 can include a plurality of holes 802. Optionally, the hole 606 can have an elongated shape aligned along a length 804 of the first object 602. For example, a length 806 of the hole 606 can be at least 70 percent of the length 804 of the first object 602.

Figure 9:
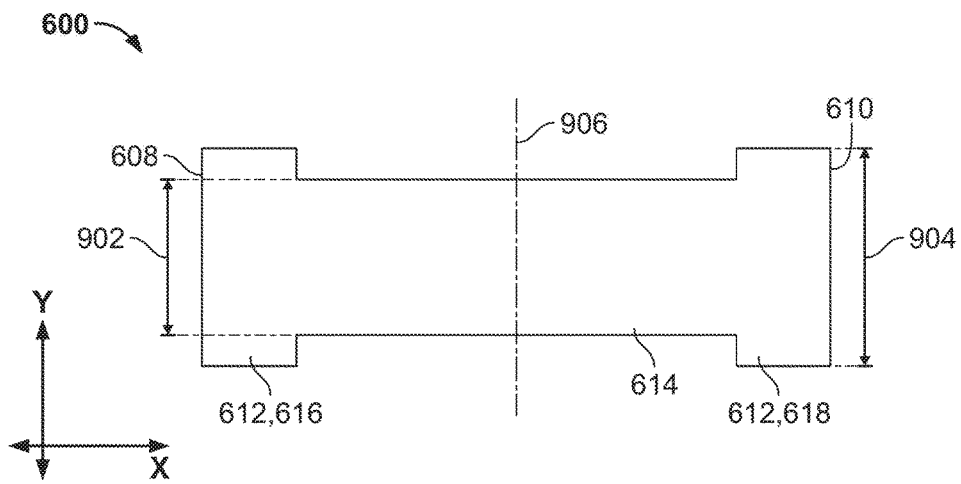
FIG. 9 is a diagram illustrating a top view of an example of the strap according to the disclosed subject matter.
Figure 10:
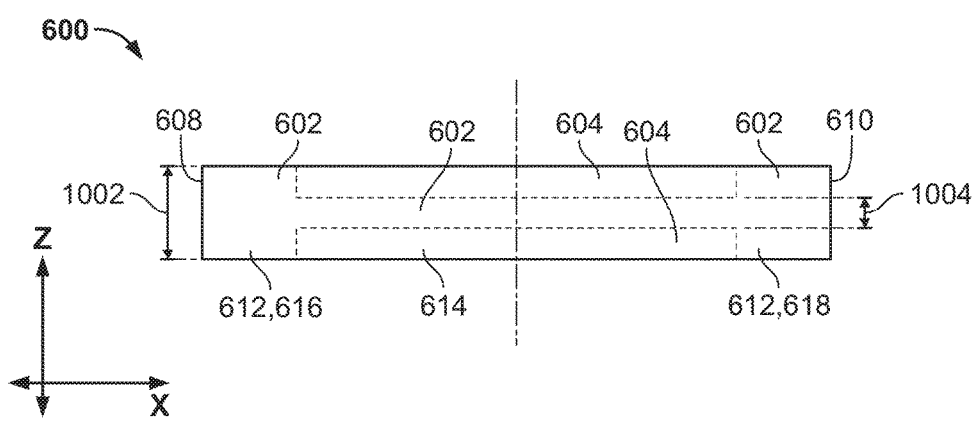
FIG. 10 is a diagram illustrating a side view of an example of the strap according to the disclosed subject matter.

FIG. 9 is a diagram illustrating a top view of an example of the strap 600 according to the disclosed subject matter. FIG. 10 is a diagram illustrating a side view of an example of the strap 600 according to the disclosed subject matter. In an aspect, a width 902 of the carrying portion 614 can be at least five times a thickness 1002 of the carrying portion 614. In an aspect, a width 904 of the attaching portion 612 can be greater than the width 902 of the carrying portion 614. In an aspect, the thickness 1002 of the first object 602 in the attaching portion 612 can be greater than a thickness 1004 of the first object 602 in the carrying portion 614. In an aspect, the strap 600 can have a substantially symmetrical shape, for example, with respect to a seventh line 906.

Figure 11:
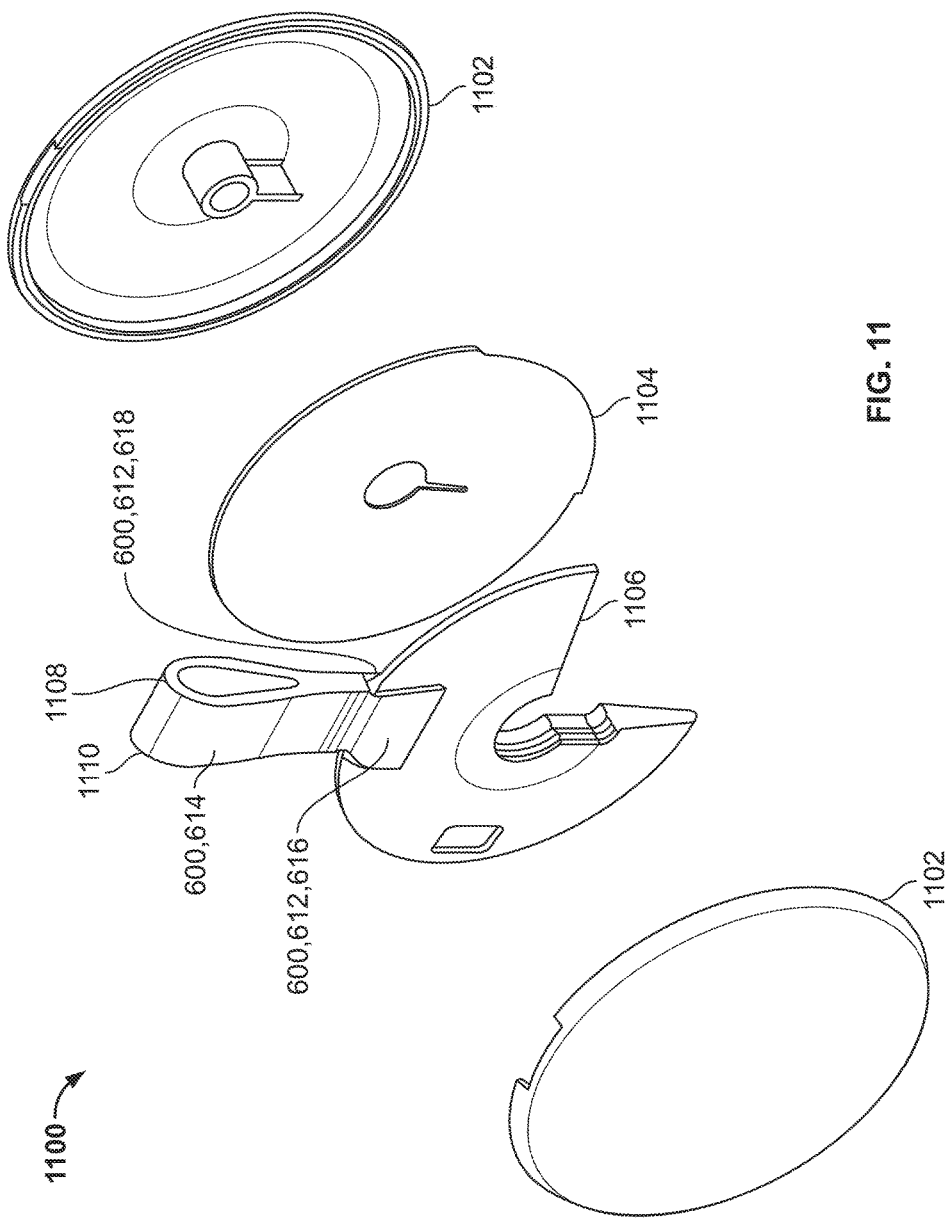
FIG. 11 is a diagram illustrating an exploded perspective view of an apparatus that incorporates the strap according to the disclosed subject matter.

FIG. 11 is a diagram illustrating an exploded perspective view of an apparatus 1100 that incorporates the strap 600 according to the disclosed subject matter. The attaching portion 612 can be configured to be disposed within a housing 1102 of the apparatus 1100. For example, the apparatus 1100 can include a Radio-Frequency Identification (RFID) tag or a Near-Field Communication (NFC) tag 1104. Optionally, the strap 600 can further include an attachment piece 1106. The attachment piece 1106 can be configured to be disposed within the housing 1102. The attaching portion 612 can be connected to the attachment piece 1106. In an aspect, the attachment piece 1106 can have a shape that substantially conforms to a shape of an interior space of the housing 1102. Optionally, the carrying portion 614 can include a fold 1108 so that the first attaching portion 616 can be in contact with the second attaching portion 618 to form a loop 1110.

Figure 12:
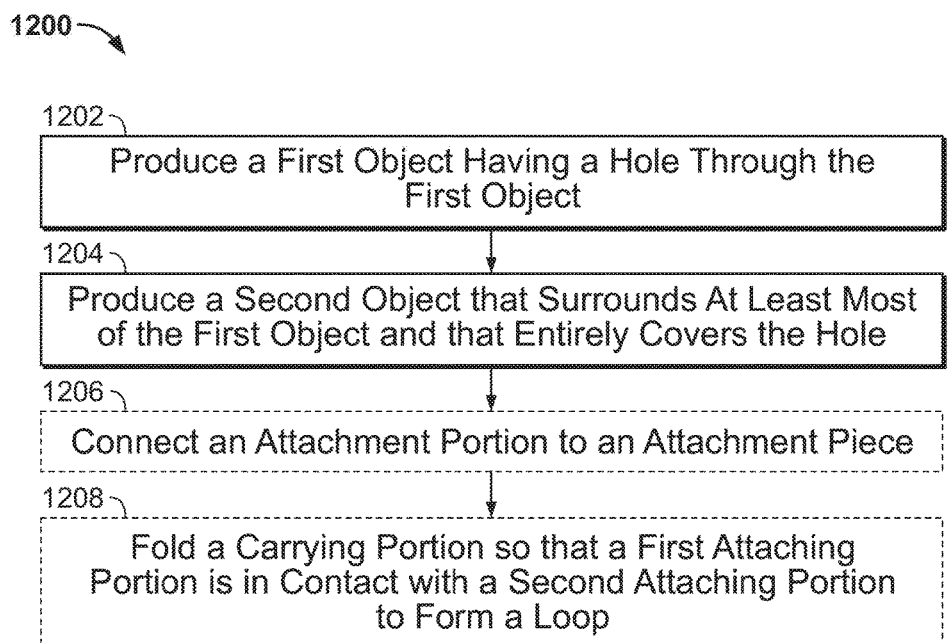
FIG. 12 is a flow diagram illustrating an example of a method for making a strap according to the disclosed subject matter.

FIG. 12 is a flow diagram illustrating an example of a method 1200 for making a strap according to the disclosed subject matter. In the method 1200, at an operation 1202, a first object having a hole through the first object can be produced. The first object can be made from a first material. The first material can have a Young's modulus of a first value. In an aspect, the first material can include, for example, one or more of polycarbonate, acrylonitrile butadiene styrene, acrylic, nylon, or acetal. For example, a piece of the first material can be die cut to include the hole through the first object. Optionally, the hole can include a plurality of holes. Optionally, the hole can have an elongated shape aligned along a length of the first object. For example, a length of the hole can be at least 70 percent of the length of the first object. For example, the first object can be the first object 602.

At an operation 1204, a second object that surrounds at least most of the first object and that entirely covers the hole can be produced. The second object can be bonded to the first object. The second object can be made from a second material. The second material can have the Young's modulus of a second value. The second value can be less than the first value. In an aspect, the second material can include, for example, one or more of thermoplastic polyurethane rubber, silicone rubber, ethylene propylene diene monomer, or Santoprene™ thermoplastic vulcanizates. For example, the second object can be the second object 604.

Figure 13:
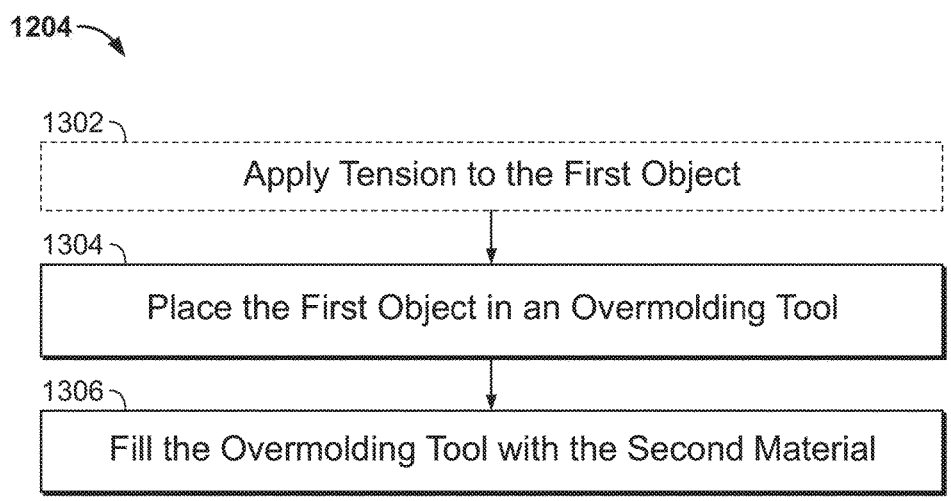
FIG. 13 is a flow diagram illustrating an example of a method for producing the second object according to the disclosed subject matter.

FIG. 13 is a flow diagram illustrating an example of a method 1204 for producing the second object according to the disclosed subject matter. In the method 1204, at an optional operation 1302, tension can be applied to the first object. At an operation 1304, the first object can be placed in an overmolding tool. The overmolding tool can include a compression molding tool. At an operation 1306, the overmolding tool can be filled with the second material The strap can include the first object and the second object. In an aspect, the strap can have a substantially symmetrical shape. The strap can have an attaching portion and a carrying portion. Optionally, the second object can entirely surround the first object in the carrying portion. In an aspect, a width of the attaching portion can be greater than a width of the carrying portion. In an aspect, a thickness of the first object in the attaching portion can be greater than a thickness of the first object in the carrying portion. Optionally, the carrying portion can have a rectangular cuboid shape. For example, the strap can be the strap 600.

Returning to FIG. 12, at an optional operation 1206, the attaching portion can be connected to an attachment piece. The attachment piece can be configured to be disposed within a housing of an apparatus. In an aspect, the attachment piece can have a shape that substantially conforms to a shape of an interior space of the housing.

Optionally, the attaching portion can include a first attaching portion and a second attaching portion. The first attaching portion can be disposed at a first end of the strap. The attaching portion can be disposed at a second end of the strap. At an optional operation 1208, the carrying portion can be folded so that the first attaching portion is in contact with the second attaching portion to form a loop.

A fob having a housing, a strap, or both as disclosed herein can be a component of a security system of a premises, such as a security system integrated in a smart home environment that can include sensors, interface components, and one or more processing units that process data generated by the sensors and that control the interface components. Data from the sensors can be used to determine the occurrence of a security breach or security related event, such as entry through a window of the premises, lengthy presence of an individual in an unusual location and an unusual time, or tampering with a lock of a door of the premises, etc. Upon the occurrence of such an event, the security system can determine, based on any of various algorithms, that an alarm is warranted and enter into an alarm mode, which can include automatically notifying a third party monitoring service as well as operating components of the system to provide visual and/or audible alerts, such as a siren sound, repeated beeping sound, or flashing lights.

Additionally, the security system can determine where a security breach has occurred and thereafter track the location of the unauthorized party, as well as the locations of authorized parties within and/or around the premises. In addition, in view of the high stress levels that can accompany experiencing an unauthorized intrusion, the security system can announce the location of the security breach and the location of the unauthorized party within the premises. In so doing the authorized occupants are automatically warned of which locations in/around the premises to avoid and the unauthorized party is simultaneously deterred from further advance due to the clear notice to the unauthorized party that he/she is being tracked. Alternatively, the location of the unauthorized party can be announced only to select devices so as to inform an authorized user while leaving the unauthorized party unaware that he/she is being tracked.

The security system can function as a subsystem of a smart facility network system and can incorporate a plurality of electrical and/or mechanical components, including intelligent, sensing, network-connected devices that can communicate with each other and/or can communicate with a central server or a cloud-computing system to provide any of a variety of security (and/or environment) management objectives in a home, office, building or the like. Such objectives, which can include, for example, managing alarms, notifying third parties of alarm situations, managing door locks, monitoring the premises, etc., herein are collectively referred to as "premises management."

A premises management system can further include other subsystems that can communicate with each other to manage different aspects of premises management as well as security. For example, a security subsystem can manage the arming, disarming, and activation of alarms and other security aspects of the premises, and a smart home environment subsystem can handle aspects such as light, temperature, and hazard detection of the premises. However, the premises management system can leverage data obtained in one subsystem to improve the functionality of another subsystem.

The security system can be operable to function in any of various modes or states. For example, security system modes can include "stay", "away" and "home" modes. In a "stay" mode the security system can operate under the assumption that authorized parties are present within the premises but will not be entering/leaving without notifying the system; therefore data from certain interior sensors can be given lower weight in determining whether an unauthorized party is present. In an "away" mode the security system can operate under the assumption that no authorized parties are in the premises; therefore data from all sensors, interior and exterior, can be accorded high weight in determining whether an unauthorized party is present. In a "home" mode the security system can operate under the assumption that authorized parties are within the premises and will be freely entering/leaving the premises without notifying the system; therefore data from certain sensors interior and exterior can be accorded low weight in determining whether an unauthorized party is present. It should be understood that these modes are merely examples and can be modified, removed, or supplemented by other modes.

In addition, the security system can function in any of various alarm states. For example, in a "green" or "low" alarm state the security system can operate under the assumption that all is well and no unauthorized parties have been detected within/around the premises. In a "yellow" or "medium" alarm state the security system can operate under the assumption that an unauthorized party is potentially present in or around the premises. In this state certain sensor data can be analyzed differently or additional confirmations of authorization, such as entering a code, can be required of to avoid escalation to a higher alarm state. In a "red" or "high" alarm state the security system can operate under the assumption that an unauthorized party has been detected on the premises and preventive measures can be taken, such as notifying a third party monitoring service and/or activating an alarm and announcement, as will be described later. It should be understood that greater or fewer gradients of alarm state can be included. Hereinafter, a heightened alarm can refer to an alarm state above the low alarm state.

The security system can be implemented as a stand-alone system or, as mentioned above, as a subsystem of a larger premises management system and can leverage data therefrom. For illustrative purposes and to demonstrate the cross use of data among systems, the security system can be part of a premises management system, such as a smart home network environment.

The individual hardware components of the premises management system that can be used to monitor and affect the premises in order to carry out premises management can be referred to as "premises management devices." The premises management devices described herein can include multiple physical hardware and firmware configurations, along with circuitry hardware (e.g., processors, memory, etc.), firmware, and software programming that are configured to carry out the methods and functions of a premises management system. The premises management devices can be controlled by a "brain" component, which can be implemented in a controller device.

Figure 14:
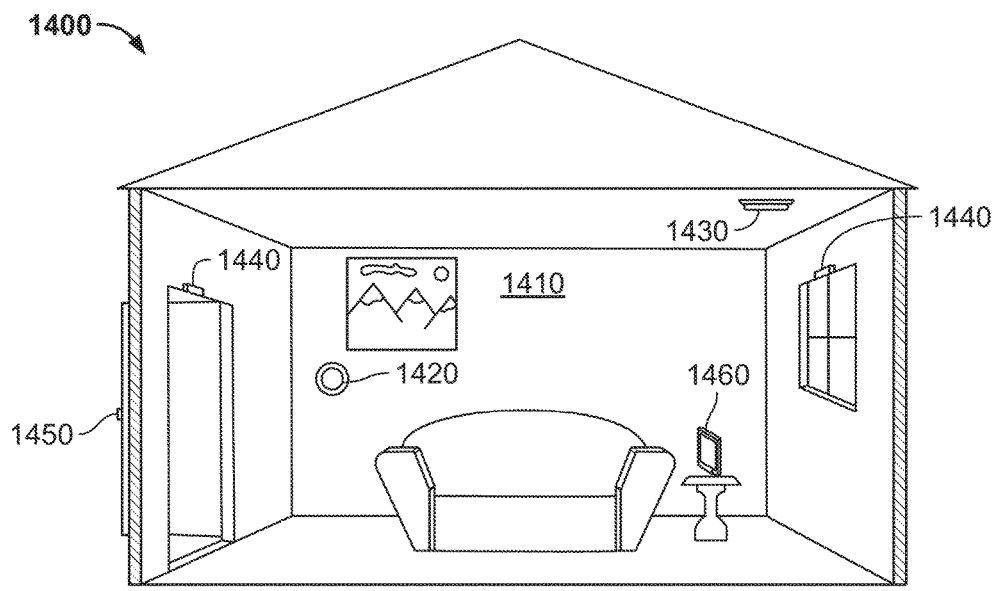
FIG. 14 is a diagram illustrating an example of an environment of a premises management system.

FIG. 14 is a diagram illustrating an example of an environment of a premises management system 1400. The system 1400 can be installed in a premises 1510. The system 1400 can implement subsystems, including the security system, via multiple types of premises management devices, such as one or more intelligent, multi-sensing, network-connected thermostats 1420, one or more intelligent, multi-sensing, network-connected hazard detection units 1430, one or more intelligent, multi-sensing, network-connected entry detection units 1440, one or more network-connected door handles 1450, one or more intelligent, multi-sensing, network-connected controller devices 1460, or any combination thereof. Data from any of these premise management devices can be used by the security system, as well as for the respective primary functions of the premise management devices.

At a high level, the system 1400 can be configured to operate as a learning, evolving ecosystem of interconnected devices. New premises management devices can be added, introducing new functionality, expanding existing functionality, or expanding a spatial range of coverage of the system. Furthermore, existing premises management devices can be replaced or removed without causing a failure of the system 1400. Such removal can encompass intentional or unintentional removal of components from the system 1400 by an authorized user, as well as removal by malfunction (e.g., loss of power, destruction by intruder, etc.). Due to the dynamic nature of the system, the overall capability, functionality and objectives of the system 1400 can change as the constitution and configuration of the system 1400 change.

In order to avoid contention and race conditions among the interconnected devices, certain decisions, such as those that affect the premises management system 1400 at a system level or that involve data from multiple sources, can be centralized in the aforementioned "brain" component. The brain component can coordinate decision making across the system 1400 or across a designated portion thereof. The brain component is a system element at which, for example, sensor/detector states can converge, user interaction can be interpreted, sensor data can be received, and decisions can be made concerning the state, mode, or actions of the system 1400. Hereinafter, the system 1400 brain component can be referred to as the "primary system processor." The function of primary system processor can be implemented in the controller device 1460, for example, hard coded into a single device, or distributed virtually among one or more premises management devices within the system using computational load sharing, time division, shared storage, or other techniques.

However implemented, the primary system processor can be configured to control subsystems and components of the premises management system 1400, such as, for example, the disclosed security system and/or a smart home environment system. Furthermore, the primary system processor can be communicatively connected to control, receive data from, or transmit data to premises management devices within the system, as well as receive data from or transmit data to devices/systems external to the system 1400, such as third party servers, cloud servers, mobile devices, and the like.

In the embodiments disclosed herein, each of the premises management devices can include one or more sensors. In general, a "sensor" can refer to any device that can obtain information about its local environment and communicate that information in the form of data that can be stored or accessed by other devices and/or systems. Sensor data can form the basis of inferences drawn about the sensor's environment. For example, the primary system processor can use data from a plurality of sensors, e.g., including entry detection unit 1440, to determine whether an unauthorized party is attempting enter the premises 1410 through a window.

A brief description of sensors that may be included in the system 1400 follows. Examples provided are not intended to be limiting but are merely provided as illustrative subjects. The system 1400 can use data from the types of sensors in order to implement features of a security system. The system 1400 can employ data from any type of sensor that provides data from which an inference can be drawn about the environment in or around the premises 1410.

Generally, sensors can be described by the type of information they collect. For example, sensor types can include motion, smoke, carbon monoxide, proximity, temperature, time, physical orientation, acceleration, location, entry, presence, pressure, light, sound, and the like. A sensor also can be described in terms of the particular physical device that obtains the environmental information. For example, an accelerometer can obtain acceleration information, and thus can be used as a general motion sensor and/or an acceleration sensor. A sensor also can be described in terms of the specific hardware components used to implement the sensor. For example, a temperature sensor can include a thermistor, thermocouple, resistance temperature detector, integrated circuit temperature detector, or combinations thereof.

A sensor further can be described in terms of a function or functions the sensor performs within the system 1400. For example, a sensor can be described as a security sensor when it is used to determine security events, such as unauthorized entry.

A sensor can be operated for different functions at different times. For example, system 1400 can use data from a motion sensor to determine how to control lighting in the premises 1410 when an authorized party is present and use the data as a factor to change a security system mode or state on the basis of unexpected movement when no authorized party is present. In another example, the system 1400 can use the motion sensor data differently when a security system mode is in an "away" mode versus a "home" state, i.e., certain motion sensor data can be ignored while the system is in a "home" mode and acted upon when the system is in an "away" mode.

In some cases, a sensor can operate as multiple sensor types sequentially or concurrently, such as where a temperature sensor is used to detect a change in temperature, as well as the presence of a person or animal. A sensor also can operate in different modes (e.g., different sensitivity or threshold settings) at the same or different times. For example, a sensor can be configured to operate in one mode during the day and another mode at night. As another example, a sensor can operate in different modes based upon a mode or the disclosed security system, state of system 1400, or as otherwise directed by the primary system processor.

Multiple sensors can be arranged in a single physical housing, such as where a single device includes movement, temperature, magnetic, and/or other sensors. Such a housing can also be referred to as a sensor, premises management device, or a sensor device. For clarity, sensors can be described with respect to the particular functions they perform and/or the particular physical hardware used.

Figure 15:
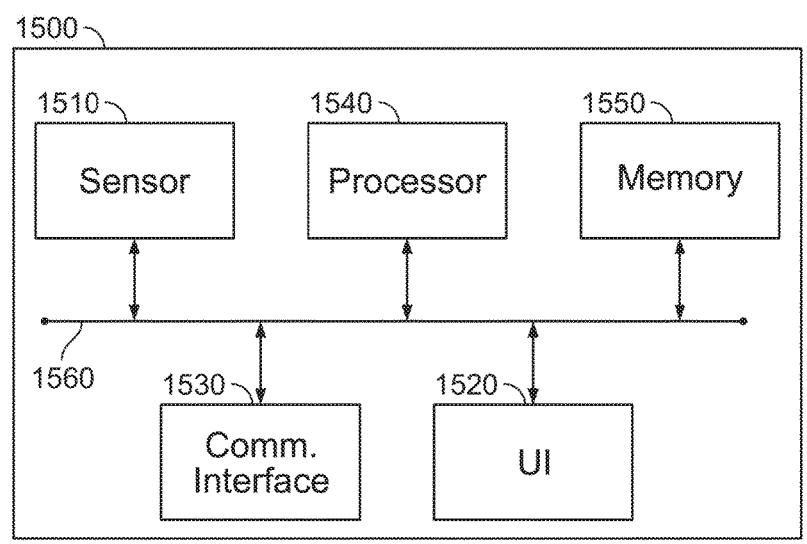
FIG. 15 is a block diagram illustrating an example of a premises management device.

FIG. 15 is a block diagram illustrating an example of a premises management device 1500. Premise management device 1500 can include a processor 1440, a memory 1450, a user interface (UI) 1520, a communications interface 1530, an internal bus 1560, and a sensor 1510. A person of ordinary skill in the art appreciates that various components of the premises management device 1500 described herein can include additional electrical circuit(s). Furthermore, it is appreciated that many of the various components listed above can be implemented on one or more integrated circuit (IC) chips. For example, in one embodiment, a set of components can be implemented in a single IC chip. In other embodiments, one or more of respective components can be fabricated or implemented on separate IC chips.

The sensor 1510 can be an environmental sensor, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, pressure sensor, microphone, compass, or any other environmental sensor that obtains or provides a corresponding type of information about the environment in which the premises management device 1500 is located.

The processor 1540 can be a central processing unit (CPU) or other type of processor and can be communicably connected to the other components to receive and analyze data obtained by the sensor 1510, can transmit messages or packets that control operation of other components of the premises management device 1500 and/or external devices, and can process communications between the premises management device 1500 and other devices. The processor 1540 can execute instructions and/or computer executable components stored on the memory 1550. Such computer executable components can include, for example, a primary function component to control a primary function of the premises management device 1500 related to managing a premises, a communication component to locate and communicate with other compatible premises management devices, a computational component to process system related tasks, or any combination thereof.

The memory 1550 or another memory in the premises management device 1500 can also be communicably connected to receive and store environmental data obtained by the sensor 1510. A communication interface 1530 can function to transmit and receive data using a wireless protocol, such as a WiFi™, Thread®, or other wireless interface, Ethernet® or other local network interface, Bluetooth® or other radio interface, or the like and can facilitate transmission and receipt of data by the premises management device 1500 to and from other devices.

The user interface (UI) 1520 can provide information and/or receive input from a user of system 1400. The UI 1520 can include, for example, a speaker to output an audible sound when an event is detected by the premises management device 1500. Alternatively, or in addition, the UI 1520 can include a light to be activated when an event is detected by the premises management device 1500. The UI 1520 can be relatively minimal, such as a liquid crystal display (LCD), light-emitting diode (LED) display, or limited-output display, or it can be a full-featured interface such as a touchscreen, keypad, or selection wheel with a click-button mechanism to enter input.

Internal components of the premises management device 1500 can transmit and receive data to and from one another via an internal bus 1560 or other mechanism. One or more components can be implemented in a single physical arrangement, such as where multiple components are implemented on a single integrated circuit. Premises management devices 1500 can include other components, and/or may not include all of the components illustrated.

The sensor 1510 can obtain data about the premises, and at least some of the data can be used to implement the security system. Through the bus 1560 and/or communication interface 1530, sensor data can be transmitted to or accessible by other components of the system 1400. Generally, two or more sensors 1510 on one or more premises management devices 1500 can generate data that can be coordinated by the primary system processor to determine a system response and/or infer a state of the environment. In one example, the primary system processor of the system 1400 can infer a state of intrusion based on data from entry detection sensors and motion sensors and, based on the determined state, further determine whether an unauthorized party is present and a location, within the premises, of the unauthorized party.

Figure 16:
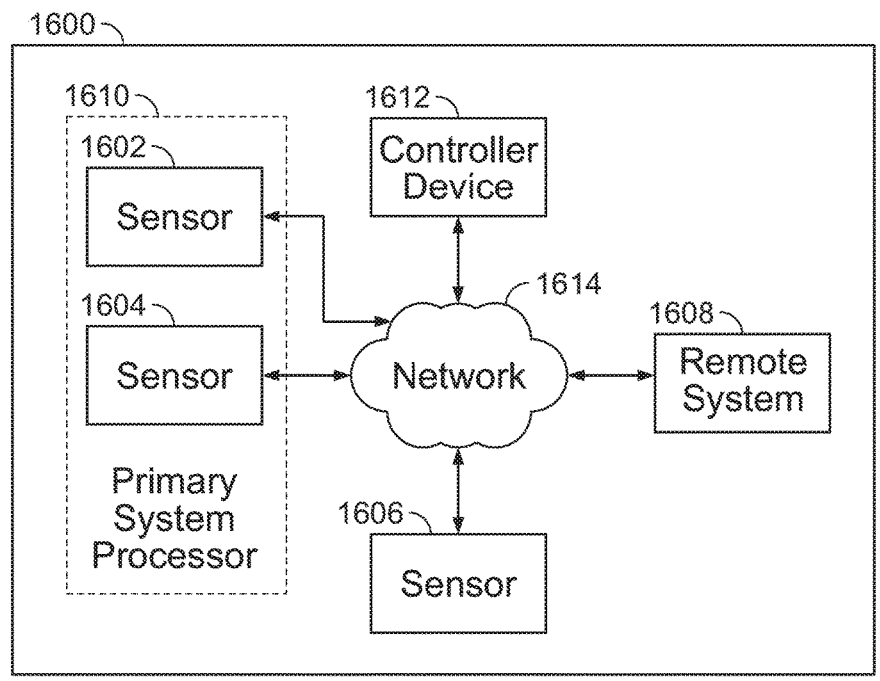
FIG. 16 is a block diagram illustrating an example of a premises management system.

FIG. 16 is a block diagram illustrating an example of a premises management system 1600. The premises management system 1600 can include security system features. System 1600 can be implemented over any suitable wired and/or wireless communication networks. One or more premises management devices, i.e., sensors 1602, 1604, 1606, and one or more controller devices 1612 can communicate via a local network 1614, such as a WiFi™ or other suitable network, with each other. The network 1614 can include a mesh-type network such as Thread®, which can provide network architecture and/or protocols for devices to communicate with one another. An authorized party can therefore interact with the premises management system 1600, for example, using the controller device 1612, which can communicates with the rest of the system 1600 via the network 1614.

The controller device 1612 and/or one or more of the sensors 1602, 1604, 1606, can be configured to implement a primary system processor 1610. The primary system processor 1610 can, for example, receive, aggregate, and/or analyze environmental information received from the sensors 1602, 1604, 1606, and the controller device 1612. Furthermore, a portion or percentage of the primary system processor 1610 can be implemented in a remote system 1608, such as a cloud-based reporting and/or analysis system. The remote system 1608 can, for example, independently aggregate data from multiple locations, provide instruction, software updates, and/or aggregated data to a controller 1612, primary system processor 1610, and/or sensors 1602, 1604, 1606.

The sensors 1602, 1604, 1606, can be disposed locally to one another, such as within a single dwelling, office space, building, room, or the like, or they may be disposed remote from each other, such as at various locations around a wide perimeter of a premises. In some embodiments, sensors 1602, 1604, 1606, can communicate directly with one or more remote systems 1608. The remote system 1608 can, for example, aggregate data from multiple locations, provide instruction, software updates, and/or aggregated data to the primary system processor 1610, controller device 1612, and/or sensors 1602, 1604, 1606. In addition, remote system 1608 can refer to a system or subsystem that is a part of a third party monitoring service or a law enforcement service.

The premises management system illustrated in FIG. 16 can be a part of a smart-home environment, which can include a structure, such as a house, office building, garage, mobile home, or the like. The devices of the smart home environment, such as the sensors 1602, 1604, 1606, and the network 1614 can be integrated into a smart-home environment that does not include an entire structure, such as a single unit in an apartment building, condominium building, or office building.

The smart home environment can control and/or be coupled to devices outside of the structure. For example, one or more of the sensors 1602, 1604 can be located outside the structure at one or more distances from the structure (e.g., sensors 1602, 1604 can be disposed outside the structure, at points along a land perimeter on which the structure is located, or the like. One or more of the devices in the smart home environment may need not be physically within the structure. For example, the controller 1612, which can receive input from the sensors 1602, 1604, can be located outside of the structure.

The structure of the smart-home environment can include a plurality of rooms, separated at least partly from each other via walls. The walls can include interior walls or exterior walls. Each room can further include a floor and a ceiling. Devices of the smart-home environment, such as the sensors 1602, 1604, can be mounted on, integrated with, and/or supported by a wall, floor, or ceiling of the structure.

The controller device 1612 can be a general or special-purpose controller. For example, one type of controller device 1612 can be a general-purpose computing device running one or more applications that collect and analyze data from one or more sensors 1602, 1604, 1606 within the home. In this case, the controller device 1612 can be implemented using, for example, a mobile computing device such as a mobile phone, a tablet computer, a laptop computer, a personal data assistant, or wearable technology. Another example of a controller device 1612 can be a special-purpose controller that is dedicated to a subset of functions, such as a security controller that collects, analyzes and provides access to sensor data primarily or exclusively as it relates to various security considerations for a premises. The controller device 1612 can be located locally with respect to the sensors 1602, 1604, 1606 with which it can communicate and from which it can obtain sensor data, such as in the case where it is positioned within a home that includes a home automation and/or sensor network. Alternatively or in addition, controller device 1612 can be remote from the sensors 1602, 1604, 1606, such as where the controller device 1612 is implemented as a cloud-based system that can communicate with multiple sensors 1602, 1604, 1606, which can be located at multiple locations and can be local or remote with respect to one another.

Sensors 1602, 1604, 1606 can communicate with each other, the controller device 1612, and the primary system processor 1610 within a private, secure, local communication network that can be implemented wired or wirelessly, and/or a sensor-specific network through which sensors 1602, 1604, 1606 can communicate with one another and/or with dedicated other devices. Alternatively, as illustrated in FIG. 16, one or more sensors 1602, 1604, 1606 can communicate via a common local network 1614, such as a Wi-Fi™, Thread®, or other suitable network, with each other, and/or with the controller 1612 and primary system processor 1750. Alternatively or in addition, sensors 1602, 1604, 1606 can communicate directly with a remote system 1608.

The smart-home environment, including the sensor network shown in FIG. 16, can include a plurality of premises management devices, including intelligent, multi-sensing, network-connected devices that can integrate seamlessly with each other and/or with a central server or a cloud-computing system (e.g., controller 1612 and/or remote system 1608) to provide home-security and smart-home features. Such devices can include one or more intelligent, multi-sensing, network-connected thermostats (e.g., "smart thermostats"), one or more intelligent, network-connected, multi-sensing hazard detection units (e.g., "smart hazard detectors"), one or more intelligent, multi-sensing, network-connected entryway interface devices (e.g., "smart doorbells"), or any combination thereof. The smart hazard detectors, smart thermostats, and smart doorbells can be, for example, the sensors 1602, 1604, 1606 illustrated in FIG. 16. These premises management devices can be used by the security system, but can also have separate, primary functions.

For example, a smart thermostat can detect ambient climate characteristics (e.g., temperature and/or humidity) and can accordingly control a heating, ventilating, and air conditioning (HVAC) system of the structure. For example, the ambient climate characteristics can be detected by sensors 1602, 1604, 1606 illustrated in FIG. 16, and the controller 1612 can control the HVAC system (not illustrated) of the structure. However, unusual changes in temperature of a given room can also provide data that can supplement a determination of whether a situation is a security concern, for example, detecting a rapid drop in temperature in a given room due to a broken in window.

As another example, a smart hazard detector can detect the presence of a hazardous substance or a substance indicative of a hazardous substance (e.g., smoke, fire, or carbon monoxide). For example, smoke, fire, and/or carbon monoxide can be detected by sensors 1602, 1604, 1606 illustrated in FIG. 16, and the controller 1612 can control an alarm system to provide a visual and/or audible alarm to the user of the smart-home environment. However, the speaker of the hazard detector can also be used to announce security related messages.

As another example, a smart doorbell can control doorbell functionality, detect a person's approach to or departure from a location (e.g., an outer door to the structure), and announce a person's approach or departure from the structure via an audible and/or visual message that can be output by a speaker and/or a display coupled to, for example, the controller 1612. However, the detection of an approach of an unknown party can provide data to the security system to supplement determining whether the presence of the unknown party is a security concern.

A smart-home environment can include one or more intelligent, multi-sensing, network-connected entry detectors (e.g., "smart entry detectors") that can be specifically designed to function as part of a security subsystem. Such detectors can be or can include one or more of the sensors 1602, 1604, 1606 illustrated in FIG. 16. The smart entry detectors can be disposed at one or more windows, doors, and other entry points of the smart-home environment to detect when a window, door, or other entry point is opened, broken, breached, and/or compromised. The smart entry detectors can generate a corresponding signal to be provided to the controller 1612, primary system processor 1610, and/or the remote system 1608 when a window or door is opened, closed, breached, and/or compromised. In some embodiments of the security system, the alarm, which can be included with controller 1612 and/or coupled to the network 1614, may not arm unless all smart entry detectors (e.g., sensors 1602, 1604, 1606) indicate that all doors, windows, entryways, and the like are closed and/or that all smart entry detectors are armed.

The smart thermostats, the smart hazard detectors, the smart doorbells, the smart entry detectors, and other premise management devices of a smart-home environment (e.g., as illustrated as sensors 1602, 1604, 1606 of FIG. 16) can be communicatively connected to each other via the network 1614, and to the controller 1612, primary system processor 1610, and/or remote system 1608.

One or more users can control one or more of the network-connected smart devices in the smart-home environment using a network-connected computer or portable electronic device. In some examples, some or all of the users (e.g., individuals who live in the home) can register their mobile device, token and/or key fobs with the smart-home environment (e.g., with the controller 1612). Such registration can be made at a central server (e.g., the controller 1612 and/or the remote system 1608) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user can also use their registered electronic device to control the network-connected smart devices when the user is located inside the smart-home environment.

Alternatively, or in addition to registering electronic devices, the smart-home environment can make inferences about which individuals live in the home and are therefore users and which electronic devices are associated with those individuals. As such, the smart-home environment can "learn" who is a user (e.g., an authorized user) and permit the electronic devices associated with those individuals to control the network-connected smart devices of the smart-home environment (e.g., devices communicatively coupled to the network 1614) including, in some embodiments, sensors used by or within the smart-home environment. Various types of notices and other information can be provided to users via messages sent to one or more user electronic devices. For example, the messages can be sent via e-mail, short message service (SMS), multimedia messaging service (MMS), unstructured supplementary service data (USSD), as well as any other type of messaging services and/or communication protocols.

Figure 17:
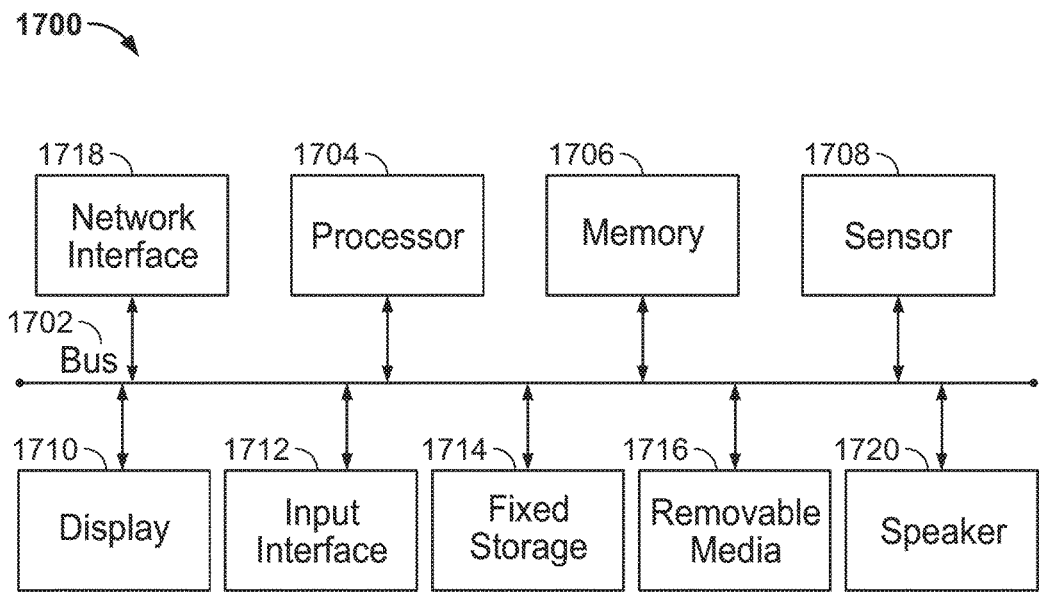
FIG. 17 is a block diagram illustrating an example of a computing device suitable for implementing certain devices illustrated in FIGS. 14 through 16.

FIG. 17 is a block diagram illustrating an example of a computing device 1700 suitable for implementing certain devices illustrated in FIGS. 14 through 16. The computing device 1700 can be used to implement, for example, the controller device 1012 or a premises management device including sensors as described above. The computing device 1700 can be constructed as a custom-designed device or can be, for example, a special-purpose desktop computer, laptop computer, or mobile computing device such as a smart phone, tablet, personal data assistant, wearable technology, or the like.

The computing device 1700 can include a bus 1702 that interconnects major components of the computing device 1700. Such components can include a central processor 1704; a memory 1706 (such as Random Access Memory (RAM), Read-Only Memory (ROM), flash RAM, or the like), a sensor 1708 (which can include one or more sensors), a display 1710 (such as a display screen), an input interface 1712 (which can include one or more input devices such as a keyboard, mouse, keypad, touch pad, turn-wheel, and the like), a fixed storage 1714 (such as a hard drive, flash storage, and the like), a removable media component 1716 (operable to control and receive a solid-state memory device, an optical disk, a flash drive, and the like), a network interface 1718 (operable to communicate with one or more remote devices via a suitable network connection), and a speaker 1720 (to output an audible communication). In some embodiments the input interface 1712 and the display 1710 can be combined, such as in the form of a touch screen.

The bus 1702 can allow data communication between the central processor 1704 and one or more memory components 1714, 1716, which can include RAM, ROM, or other memory. Applications resident with the computing device 1700 generally can be stored on and accessed via a computer readable storage medium.

The fixed storage 1714 can be integral with the computing device 1700 or can be separate and accessed through other interfaces. The network interface 1718 can provide a direct connection to the premises management system and/or a remote server via a wired or wireless connection. The network interface 1718 can provide such connection using any suitable technique and protocol, including digital cellular telephone, WiFi™, Thread®, Bluetooth®, near field communications (NFC), and the like. For example, the network interface 1718 can allow the computing device 1700 to communicate with other components of the premises management system or other computers via one or more local, wide-area, or other communication networks.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A first part of a housing, comprising:
a first surface;
a second surface forming a first edge with the first surface;
a third surface forming a second edge with the second surface;
a fourth surface forming a third edge with the third surface; and a fifth surface forming a fourth edge with the fourth surface, the fifth surface having an energy director portion or a joining surface portion, wherein the first part of the housing is configured to be attached, via an attachment, to a second part of the housing so that the first surface and a corresponding first surface of the second part form an exterior surface of the housing, the second surface abuts a corresponding second surface of the second part, the third surface abuts a corresponding third surface of the second part, the fourth surface abuts a corresponding fourth surface of the second part, and the fifth surface and a corresponding fifth surface of the second part define an interior space of the housing, the attachment being within the interior space and comprising an ultrasonic weld.

2. The first part of the housing of claim 1, wherein an angle between the third surface and a first line is less than or equal to 30 degrees, the first line intersecting the third surface and being parallel to a second line, the second line coinciding with a path of a force produced by a tool that produces the attachment.

3. The first part of the housing of claim 2, wherein a first distance between a first point and a second point is about one millimeter, the first point being at an intersection of the first line and a third line, the third line intersecting the first edge and being perpendicular to the first line, the second point intersecting the third line and being on the first edge.

4. The first part of the housing of claim 3, wherein a second distance between the second point and a corresponding second point is a percentage of the first distance, the corresponding second point being on a corresponding first edge of the second part formed between the corresponding first surface and the corresponding second surface, wherein the percentage is one-half of one percent.

5. The first part of the housing of claim 1, further comprising a first part of an alignment key, the first part of the alignment key being disposed substantially at a center of the fifth surface.

6. The first part of the housing of claim 5, wherein a distance between the center and a point is fifteen millimeters, the point being at an intersection of a first line and a second line, the first line intersecting the first edge and being parallel to a third line, the third line coinciding with a path of a force produced by a tool that produces the attachment, the second line intersecting the center and being perpendicular to the first line.

7. The first part of the housing of claim 1, further comprising the second part of the housing, the second part of the housing attached to the first part of the housing via the attachment such that a distance between the first edge and a corresponding first edge of the second part is less than or equal to five microns.

8. The first part of the housing of claim 7, further comprising a strap, the strap attached to the housing, the strap comprising:

a first object having a hole through the first object, the first object being made from a first material, the first material having a Young's modulus of a first value; and a second object that surrounds at least most of the first object and that entirely covers the hole, the second object being bonded to the first object, the second object being made from a second material, the second material having the Young's modulus of a second value, the second value being less than the first value, the strap comprising the first object and the second object.

9. The strap of claim 8, wherein:

the first material comprises at least one of polycarbonate, acrylonitrile butadiene styrene, acrylic, nylon, or acetal; and the second material comprises at least one of thermoplastic polyurethane rubber, silicone rubber, ethylene propylene diene monomer, or Santoprene™ thermoplastic vulcanizates.

10. The strap of claim 8, wherein a twisting resistance of the strap in a rotational direction is less than the twisting resistance of another strap in the rotational direction, the other strap being identical to the strap except that the other strap lacks the hole.

11. The strap of claim 8, wherein the hole has an elongated shape aligned along a length of the first object.

12. The strap of claim 8, wherein the strap has an attaching portion and a carrying portion.

13. The strap of claim 12, wherein the attaching portion is configured to be disposed within a housing for a Radio-Frequency Identification tag or a Near-Field Communication tag.

14. The strap of claim 12, wherein:

the attaching portion comprises a first attaching portion and a second attaching portion, the first attaching portion being disposed at a first end of the strap, the second attaching portion being disposed at a second end of the strap; and the carrying portion includes a fold so that the first attaching portion is in contact with the second attaching portion to form a loop.

15. A method for making a strap, comprising:

producing a first object having a hole through the first object, the first object being made from a first material, the first material having a Young's modulus of a first value; and producing a second object that surrounds at least most of the first object and that entirely covers the hole, the second object being bonded to the first object, the second object being made from a second material, the second material having the Young's modulus of a second value, the second value being less than the first value, the strap comprising the first object and the second object, wherein the producing the second object includes:

placing the first object in an overmolding tool;

applying tension to the first object; and filling the overmolding tool with the second material.

16. The method of claim 15, wherein the producing the first object comprises die cutting a piece of the first material to include the hole through the first object.

17. The method of claim 15, wherein the overmolding tool comprises a compression molding tool.

18. The method of claim 15, wherein the strap has an attaching portion and a carrying portion, wherein the attaching portion comprises a first attaching portion and a second attaching portion, the first attaching portion being disposed at a first end of the strap, the second attaching portion being disposed at a second end of the strap, and further comprising folding the carrying portion so that the first attaching portion is in contact with the second attaching portion to form a loop.

* * * * *